United States Patent
Li et al.

(10) Patent No.: US 12,192,165 B2
(45) Date of Patent: Jan. 7, 2025

(54) MESSAGE FORWARDING AND DOMAIN NAME ADDRESS QUERYING

(71) Applicant: New H3C Security Technologies Co., Ltd., Anhui (CN)

(72) Inventors: Mingyu Li, Beijing (CN); Tian Xia, Beijing (CN)

(73) Assignee: New H3C Security Technologies Co., Ltd., Anhui (CN)

( * ) Notice: Subject to any disclaimer, the term of this patent is extended or adjusted under 35 U.S.C. 154(b) by 0 days.

(21) Appl. No.: 17/755,187

(22) PCT Filed: Oct. 23, 2020

(86) PCT No.: PCT/CN2020/123378
§ 371 (c)(1),
(2) Date: Mar. 2, 2023

(87) PCT Pub. No.: WO2021/078281
PCT Pub. Date: Apr. 29, 2021

(65) Prior Publication Data
US 2024/0214345 A1    Jun. 27, 2024

(30) Foreign Application Priority Data
Oct. 25, 2019  (CN) .......................... 201911024527.7

(51) Int. Cl.
*G06F 13/00*       (2006.01)
*H04L 61/25*       (2022.01)
*H04L 61/4511*     (2022.01)

(52) U.S. Cl.
CPC .......... *H04L 61/4511* (2022.05); *H04L 61/25* (2013.01)

(58) Field of Classification Search
CPC ... H04L 61/4511; H04L 61/25; H04L 61/251; H04L 61/4552; H04L 2101/659
(Continued)

(56) References Cited

U.S. PATENT DOCUMENTS 9,843,554 B2 * 12/2017 Thornewell ......... H04L 61/4511
2005/0267978 A1   12/2005 Satapati
(Continued)

FOREIGN PATENT DOCUMENTS

CN    101018412 A    8/2007
CN    101119382 A    2/2008
(Continued)

OTHER PUBLICATIONS

Baker et al., "Framework for IPV4/IPv5 Translation", Internet Engineering Task Force (IETF) (2011).
(Continued)

*Primary Examiner* — Kenneth R Coulter
(74) *Attorney, Agent, or Firm* — McDonnell Boehnen Hulbert & Berghoff LLP

(57) ABSTRACT

The present disclosure provides a message forwarding method and apparatus, a domain name address query method and apparatus, a network address translation device, and a computer-readable medium. The message forwarding method includes: receiving a first address query request for a target domain name sent by a client; if not finding the network address corresponding to the target domain name locally, sending a second address query request for the target domain name to a domain name system; receiving a second response message returned by the domain name system for the second address query request, which includes a first network address and address translation information; sending a first response message to the client; and after receiving a service message whose destination address is the first network address sent by the client, according to the address translation information, translating the destination address of the service message to the second network address, and sending the service message with the translated destination address to the target server. The method can realize the (Continued)

automatic operation and maintenance of the network address translation equipment and ensure the timely and accurate cross-protocol forwarding of network messages.

16 Claims, 8 Drawing Sheets

(58) Field of Classification Search
USPC .......................................................... 709/245
See application file for complete search history.

(56) References Cited

U.S. PATENT DOCUMENTS

| 2013/0212240 | A1 | 8/2013 | Thornewell |
| 2018/0097729 | A1 | 4/2018 | Srivastav |

FOREIGN PATENT DOCUMENTS

| CN | 103109617 A | 5/2013 |
| CN | 103636182 A | 3/2014 |
| CN | 103957152 A | 7/2014 |
| CN | 105306607 A | 2/2016 |
| JP | 2004254203 A | 9/2004 |
| JP | 2015216593 A | 12/2015 |

OTHER PUBLICATIONS

Korhonen, "Analysis of solution proposals for hosts to learn NAT64 prefix draft-korhonen-behave-nat64-learn-analysis-00.txt" (2010).
Bagnulo et al., "DNS64: DNS Extensions of Network Address Translation from IPv6 Clients to IPv4 Servers" (2011).
Hideki Sato, NAT64/DNS64, JPNIC Newsletter No. 64, Japan Network Information Center JPNIC, Nov. 2016.

\* cited by examiner

| Additional records |
|---|
| <Root>:type PREFIX |
| Name:example.com |
| Type: PREFIX (64) |
| Class:IN(0x001) |
| TTL: 24hours |
| RDlength: 32 |
| Rdata: 2001: : /96 |

FIG. 4b

```
Frame 1: 124 bytes on wire (992 bits), 124 bytes captured (992 bits)
Ethernet II, Src: HS-WLB-Physserver-26_11:f0:c8:3b (02:1a:11:f0:c8:3b), Dst: Apple_
Internet Protocol Version 4, Src: 192.168.43.1 (192.168.43.1), Dst: 192.168.43.9 ()
User Datagram Protocol, Src Port: domain (53), Dst Port: 51677 (51677)
Request In: 1
 [Time: 0.003730000 seconds]
 Transaction ID: 0x528e
 Flags: 0x8180 (Standard query response, No error)
   1... .... .... .... = Response: Message is a response
   .000 0... .... .... = Opcode: Standard query (0)
   .... .0.. .... .... = Authoritative: Server is not an authority for domain
   .... ..0. .... .... = Truncated: Message is not truncated
   .... ...1 .... .... = Recursion desired: Do query recursively
   .... .... 1... .... = Recursion available: Server can do recursive queries
   .... .... .0.. .... = Z: reserved (0)
   .... .... ..0. .... = Answer authenticated: Answer/authority portion was not au
   .... .... ...0 .... = Non-authenticated data: Unacceptable
   .... .... .... 0000 = Reply code: No error (0)
 Questions: 1
 Answer RRs: 1
 Authority RRs: 0        here changed to 1, indicating that there is one
 Additional RRs: 0       additional resource record
 Queries
   8.8.8.8.in-addr.arpa: type PTR, class IN
     Name: 8.8.8.8.in-addr.arpa
     Type: PTR (Domain name pointer)
     Class: IN (0x0001)
 Answers
   8.8.8.8.in-addr.arpa: type PTR, class IN, google-public-dns-a.google.com
     Name: 8.8.8.8.in-addr.arpa
     Type: PTR (Domain name pointer)
     Class: IN (0x0001)
     Time to live: 12 hours, 16 minutes, 55 seconds
     Data length: 32
     Domain name: google-public-dns-a.google.com
```

FIG. 5

MESSAGE FORWARDING AND DOMAIN NAME ADDRESS QUERYING

The present disclosure is a U.S. National Phase Application under 35 U.S.C. § 371 of International Application No. PCT/CN2020/123378 filed Oct. 20, 2020, which claims priority to Chinese patent application No. 201911024527.7 filed with China National Intellectual Property Administration on Oct. 25, 2019, and entitled "Method, Apparatus, Device and Medium for Message Forwarding and Domain Name Address Querying", both of which are incorporated herein by reference in their entirety.

BACKGROUND

With the development of the Internet, IPv4 (Internet Protocol Version 4) addresses have gradually been exhausted, and IPv6 (Internet Protocol Version 6) networks will eventually replace the existing IPv4 and become the backbone of the Internet. However, due to many reasons such as cost and technical limitations, IPv4 device will still exist for a long time. Therefore, the deployment of IPv6 is a smooth evolution process, and IPv6 and IPv4 will coexist for a long time.

In order to solve the problems in IPv6 clients accessing IPv4 networks, the prior art provides a solution of NAT64 (Network Address Translation for IPv6-IPv4)+DNS64 (Domain Name System for IPv6-IPv4). FIG. 1 shows a flow chart of message forwarding based on NAT64+DNS64 in the prior art. A typical message forwarding process may include the following operations:

1) when an IPv6 client is ready to access a server with a domain name of example.com, the IPv6 client first initiates an AAAA query to a DNS64 server to request the address corresponding to the domain name example.com;
2) if the DNS64 server does not have a record of the domain name locally, the DNS64 server will initiate an AAAA query to a DNS66 (Domain Name System for IPv6-IPv6) server to request the address corresponding to the domain name example.com;
3) if the DNS66 server does not have a record of the domain name, the DNS66 server will return a null value to the DNS64 server;
4) after the DNS64 server receives the null value, the DNS64 server initiates a query to a DNS44 (Domain Name System for IPv4-IPv4) server to request the address corresponding to the domain name example.com;
5) if the DNS44 server has the IPv4 address record of the domain name, the DNS44 server sends a DNS response message to the DNS64 server to inform that the address corresponding to the domain name example.com is 192.0.2.1;
6) after obtaining the IPv4 address corresponding to the domain name, the DNS64 server uses a preset prefix (for example, 2001:db8:cdef::) to translate the IPv4 address into an IPv6 address (for example, 2001:db8:cdef:192.0.2.1), and returns the translated address to the IPv6 client in a DNS response message;
7) the IPv6 client initiates an IPv6 access via a NAT64 device and sends an IPv6 message to the NAT64 device; the destination address of the IPv6 message is the translated IPv6 address 2001:db8:cdef:192.0.2.1, and the source address is the address of the IPv6 client;
8) after receiving the IPv6 message sent by the IPv6 client, the NAT64 device translates the source/destination IPv6 address of the message into an IPv4 address by using a pre-configured NAT64 translation rule, and sends to an IPv4 server with a domain name of example.com and an IPv4 address of 192.0.2.1; the NAT64 translation rule of the NAT64 device is necessary to correspond to the prefix configuration of the DNS64, otherwise the translation cannot be achieved;
9) the NAT64 device receives the IPv4 message responded by the IPv4 server, and then uses a translation relationship reverse to that in the operation 8) to translate the IPv4 message into an IPv6 message (which is usually a reverse translation that matches with sessions on the NAT64 device);
10) the NAT64 device sends the translated IPv6 message to the IPv6 client.

BRIEF DESCRIPTION OF THE DRAWINGS

In order to explain the examples of the present disclosure and the technical scheme of the prior art more clearly, the drawings used in the prior art and the examples will be described briefly in the following, and it is apparent that the drawings in the description below are only some examples of the present disclosure and those skilled in the art can obtain other drawings according to these drawings without inventive efforts.

FIG. 4b shows an example diagram of an additional record in a second response message according to the present disclosure;

FIG. 5 shows an example diagram of header information in a second response message according to the present disclosure;

DETAILED DESCRIPTION OF THE INVENTION

For the clarity of the purpose, technical scheme, and advantages of the present disclosure, the present disclosure
} will be further described in detail below with reference to the drawings and examples. It is apparent that the described examples are only part of the examples of the present disclosure, rather than all of them. All other examples obtained by those skilled in the art without inventive efforts is within the scope of the present disclosure according to the examples of the present disclosure.

It should be noted that, unless otherwise specified, the technical terms or scientific terms used in the examples of the present disclosure should be the ordinary meaning understood by those skilled in the art to which the application belongs.

Terms involved in examples of the present disclosure are briefly described below:
1) DNS (Domain Name System): a system for querying a network address corresponding to a domain name, which may be hardware or software.
2) NAT (Network Address Translation) device: a network device with a NAT function, which may be a network device across IPv6 and IPv4 networks and realizes cross-protocol network forwarding of messages by translating network addresses.

In addition, the terms "first" and "second" are used to distinguish different objects, rather than to describe a specific order. Furthermore, the terms "include" and "have" and any variations thereof are intended to cover non-exclusive inclusion. For example, processes, methods, systems, products, or devices that include a series of operations or units are not limited to the listed operations or units, but optionally include unlisted operations or units, or optionally also include other operations or units inherent to these processes, methods, products or device.

For facilitating the understanding, in conjunction with the schematic diagram of the application scenario shown in FIG. 2, an application scenario of the present disclosure will be described below.

Figure 1:
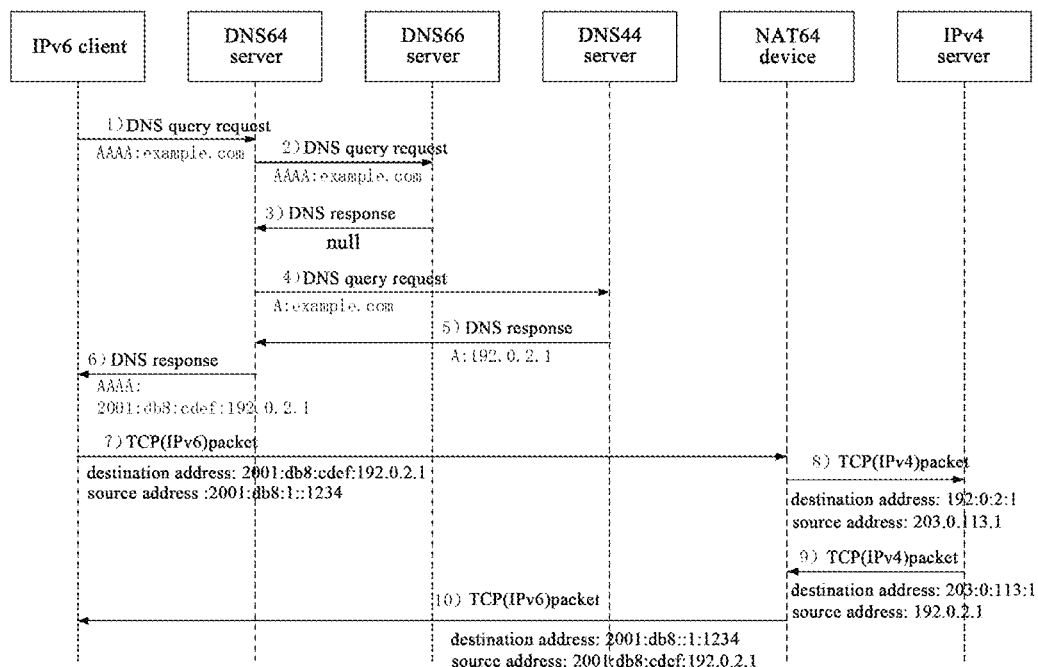
FIG. 1 shows an example flowchart of a message forwarding method in the prior art.

In the prior art as shown in FIG. 1, a translation strategy is manually configured on the network address translation device 10 (such as NAT64). The IPv6 prefix used in the strategy must be consistent with the prefix used on the DNS64 for translating the IPv6 address, otherwise the translation cannot be implemented.

In practice, manually configuring of the above-mentioned translation strategy on the NAT64 device is required for huge workload, and thus automatic operation and maintenance cannot be realized, which is inefficient and error-prone. If the translation strategy is not synchronized in time or incorrectly, the network will be interrupted, and thus the cross-protocol network messages cannot be forwarded timely and accurately. Therefore, the prior art has problems of low efficiency, fallibility, and inability to ensure the timely and accurately forwarding of cross protocol network messages. Examples of the present disclosure provide a communication channel between the network address translation device 10 and the domain name system 20.

Upon performing a cross-protocol domain name address query, the domain name system not only translates a second network address that supports a second Internet protocol into a first network address that supports a first Internet protocol, but also sends address translation information between the second network address and the first network address to the network address translation device 10. In this way, the network address translation device 10 can perform a destination address translation on a service message sent by the client 50, according to the address translation information, wherein a destination address of the service message is the first network address; and send the service message with the translated destination address to the server 60. As a result, the network address translation device 10 can be automatically synchronized with the domain name system according to the address translation information such that the network address translation device 10 can realize automatic operation and maintenance, thereby avoiding the problems of low efficiency and fallibility due to manually configuring of address translation information for the network address translation device 10, and improving the efficiency, stability and reliability of operation and maintenance, avoiding network interruption, and facilitating to ensure that the network address translation device 10 forwards network messages across protocols in time and accurately.

The above is only an exemplary explanations of an application scenario according to the examples of the present disclosure, and does not mean any limitation. Those skilled in the art can flexibly and optionally implement on the basis of the above exemplary explanations, and all of them should fall in the scope of the present disclosure.

With reference to the above description of the application scenario, examples of the present disclosure provide a message forwarding method and apparatus, a method and apparatus for querying a domain name address, a network address translation device, and a computer-readable medium, which will be described with reference to the drawings.

Figures 3, 4A:
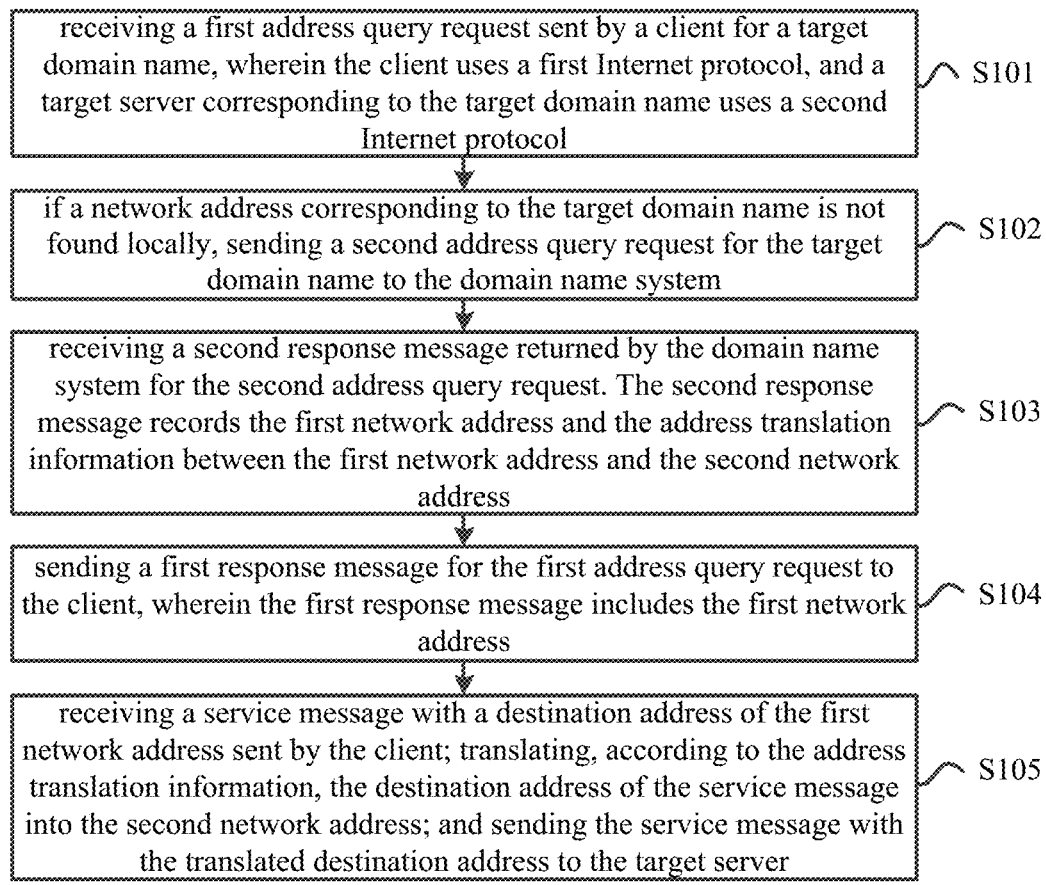
FIG. 3 shows an example flowchart of a message forwarding method according to the present disclosure.
FIG. 4a shows an example diagram of an additional record in a second response message according to the present disclosure.

FIG. 3 shows an example flowchart of a message forwarding method according to the present disclosure. The message forwarding method is applied to a network address translation device. As shown in FIG. 3, the method may include the following blocks S101 to S105.

Block S101: receiving a first address query request sent by a client for a target domain name, wherein the client uses a first Internet protocol, and a target server corresponding to the target domain name uses a second Internet protocol.

Figure 2:
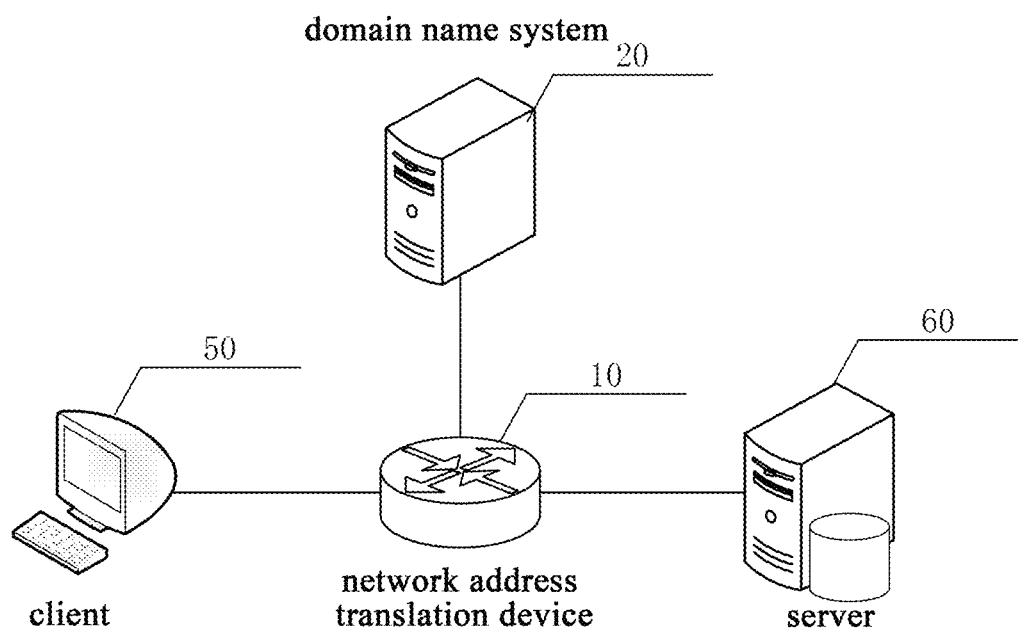
FIG. 2 shows an example diagram of an application scenario according to the present disclosure.
Figure 11:
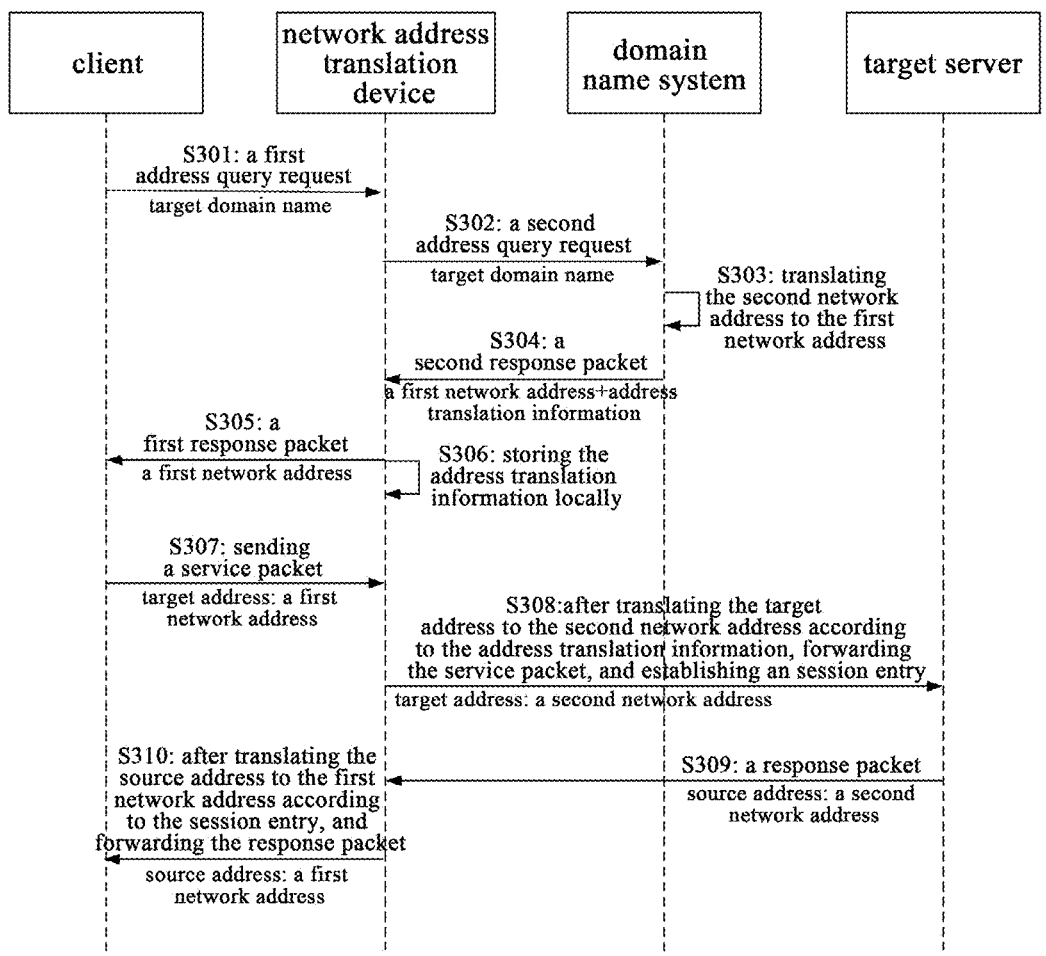
FIG. 11 shows an example sequence diagram of a message forwarding method according to the present disclosure.

This example can be understood with reference to FIG. 2 and FIG. 11. The network address translation device 10 can be used as a proxy DNS, or at least has a function of a proxy DNS. When the client 50 queries an address corresponding to a target domain name, instead of sending an address query request to the DNS 20, the client 50 sends a first address query request to the network address translation device 10. The destination address in the first address query request is the address of the network address translation device 10, rather than the address of the DNS 20, so that the client 50 sends the first address query request to the network address translation device 10.

Block S102: if a network address corresponding to the target domain name is not found locally, sending a second address query request for the target domain name to the domain name system.

The network address translation device 10 receives the first address query request, and locally queries a network address corresponding to the target domain name. If a network address corresponding to the target domain name is not found locally, the network address translation device 10 sends a second address query request to the DNS 20. The source address of the second address query request is the address of the network address translation device 10, and the destination address is the address of the DNS 20, so that the network address translation device 10 sends the second address query request to the DNS 20 and can receive a response message returned by the DNS20.

After receiving the second address query request, if the found second network address only supports the second Internet protocol, the domain name system DNS 20 translates the found second network address into a first network address that supports the first Internet protocol, and then sends a second response message for the second address query request to the network address translation device 10. The second response message includes the first network address and the address translation information between the first network address and the second network address, so that the network address translation device 10 may perform a destination address translation on a service message sent by the client 50, wherein a destination address of the service message is the first network address.

Block S103: receiving a second response message returned by the domain name system for the second address query request. The second response message records the first network address and the address translation information between the first network address and the second network address.

The second network address includes a network address that supports the second Internet protocol and corresponds to the target domain name, and the first network address includes a network address that supports the first Internet protocol, which is translated by the domain name system from the second network address.

Block S104: sending a first response message for the first address query request to the client, wherein the first response message includes the first network address.

After receiving the first network address, the network address translation device 10 may send the first network address to the client 50 to realize the function of a proxy DNS.

Block S105: receiving a service message sent by the client, wherein a destination address of the service message is the first network address; translating, according to the address translation information, the destination address of the service message into the second network address; and sending the service message with the translated destination address to the target server.

After receiving the first network address, the client 50 may send a service message to the target server (for example, the server 60) corresponding to the target domain name according to the first network address.

After receiving the service message sent by the client 50, wherein a destination address of the service message is the first network address, the network address translation device 10 may translate the destination address of the service message into the second network address according to the address translation information, and sends the service message with the translated destination address to the target server (for example, the server 60).

In a message forwarding method according to an example of the present disclosure, after receiving a first address query request for a target domain name sent by the client, the network address translation device first locally queries a network address corresponding to the target domain name; if no such network address is found, sends a second address query request for the target domain name to the domain name system, and receives a second response message that includes the first network address and address translation information returned by the domain name system; sends a first response message for the first address query request to the client; after receiving a service message sent by the client, wherein a destination address of the service message is the first network address, translates the destination address of the service message into the second network address according to the address translation information, and sends the service message with the translated destination address to the target server.

The above-mentioned method changes the existing mechanism of domain name address query and domain name system response. Instead of directly sending an address query request to the domain name system, the client sends an address query request to the network address translation device. The network address translation device may implement a domain name address query by using a local query in combination with a query to the domain name system, and return the found first network address to the client, thereby realizing the function of a proxy domain name system. Since, in the query process, the address translation information is also sent to the network address translation device by the domain name system, the network address translation device may perform a destination address translation on the service message sent by the client by using the address translation information, thereby realizing the cross-protocol network forwarding of service messages.

The example method not only enables the smooth implementation of domain name address query, but also enables the network address translation device to automatically and obtain the address translation information in real time without manual participation, thereby realizing the automatic operation and maintenance of a network address translation device and avoiding the problems of low efficiency and fallibility due to the manual configurating of address translation information for the network address translation device, improving the efficiency, stability and reliability of operation and maintenance, avoiding network interruption, and thus ensuring the timely and accurate forwarding of cross-protocol network messages.

In the examples of the present disclosure, the first Internet protocol includes the Internet Protocol Version 6, IPv6, and the second Internet protocol includes the Internet Protocol Version 4, IPv4; or, the first Internet protocol includes the Internet Protocol Version 4, IPv4, and the second Internet protocol includes the Internet Protocol version 6, IPv6. That is, service messages may be forwarded from an IPv6 network to an IPv4 network, or from an IPv4 network to an IPv6 network, which is not limited in the examples of the present disclosure. For facilitating the understanding and description, in the part of the description of the present disclosure, the service messages may be referred to as cross-protocol network messages.

In addition, in the examples of the present disclosure, the network address translation device may refer to a message forwarding device between two networks with different Internet protocols (for example, an IPv6 network and an IPv4 network), which is used to forward messages across network protocols from an IPv6 network to an IPv4 network or from an IPv4 network to an IPv6 network, which is not limited in the examples of the present disclosure.

In practice, the network address translation device may have different names, such as NAT64, NAT46, AFT (Address Family Translation), etc., which are not limited in the examples of the present disclosure.

In the examples of the present disclosure, the second response message includes additional records for recording the address translation information between the first network address and the second network address. In one example, the second response message is a DNS response message.

In one example, by adding additional records (may also be referred to as additional resource records, called as additional records hereinafter) in the response messages, that is, by transferring the address translation information along with second response messages to network address translation device, the example of the present disclosure can be implemented on the basis of the prior art with a slight modification to the response messages, which thus has advantages of simplicity, ease of implementation, and low cost. Furthermore, the methods according to the examples of the present disclosure can be implemented with only a simple software upgrade for function upgrade and without modifying of the hardware in the network architecture. Therefore, the examples of the present disclosure also have the advantages of simplicity, ease of implementation, and low modification cost.

Based on the above-mentioned examples, in some examples, after the network address translation device receives the second response message returned by the domain name system for the second address query request, the method may further include:

reading, by the network address translation device, the address translation information between the first network address and the second network address from the additional records in the second response message.

Since many types of additional records may be set in a response message, in an example, after the network address translation device receives the second response message returned by the domain name system for the second address query request, the method may further include:

searching, by the network address translation device, for an additional record of a predefined type from the content area of the second response message, and reading the address translation information between the first network address and the second network address from the additional record of the predefined type.

In an example, the DNS may add the additional record into the response message according to a preset format. For example, FIG. 4*a* shows an example diagram of an additional record in a second response message according to the present disclosure. If the first Internet protocol is IPv6, the second Internet protocol is IPv4, and the address translation information is prefix information for a translation from the first network address to the second network address, a type "PREFIX" of additional record may be added in the response message according to Table 1 below. The type value may use, but is not limited to, the reserved bits 64 (other values are also possible), which is used to indicate the prefix and length of the IPv6 address.

TABLE 1

| Type | Value | Definition | Reference |
|---|---|---|---|
| PREFIX | 64 | prefix of IPv6 address | Newly added |

The format and content of the above additional records can be filled in with reference to Table 2 below:

TABLE 2

| Field | Length | Description |
|---|---|---|
| NAME (the "Name" in FIG. 4a) | undefined length | the domain name contained in the resource record |
| TYPE (the "Type" in FIG. 4a) | 2 bytes | indicating the type of resource record, which is "prefix" in the example of the present disclosure, and the value is 64 |
| CLASS (the "Class" in FIG. 4a) | 2 bytes | indicating the class of RDATA, the value may be "IN(0x0001)" |
| TTL | 4 bytes | an unsigned integer indicating the time that the additional record can be cached. 0 means it can only be transmitted, not cached |

TABLE 2-continued

| Field | Length | Description |
|---|---|---|
| RDLENGTH (the "RDlength" in FIG. 4a) | 2 bytes | an Unsigned integer, indicating the length of RDATA, calculated by actual |
| RDATA(the "Rdata" in FIG. 4a) | undefined length | string, indicating the detailed content of the additional record; in this example, it indicates the prefix and length used to translate the IPv6 address |

The filled-in additional record can be shown in FIG. 4*a*, which will not be repeated here.

FIG. 4*b* is an example of filled-in additional records.

In the example, Name:example.com indicates that the domain name contained in the resource record is "example.com"; Type: PREFIX (64) indicates that the type of the resource record is the prefix type, and the type value is 64; Class: IN (0x001) indicates the class of record data (RDATA), and its value is 0x0001; TTL: 24 hours indicates that the additional record can be cached for 24 hours; RDlength: 32 indicates that the length of RDATA is 32; Rdata:2001::/96 indicates that the detailed content of the additional record is 2001::/96, in which "2001::" is the prefix of the IPv6 address and "96" is the length of the IPv6 address.

In the above example, the domain name system may add an additional record to the second response message according to a preset format, and specify a type for the additional record, so that the network address translation device may automatically and correctly parse the additional record to obtain the address translation information according to the format and type.

Based on the example, in some examples, before searching for an additional record of a predefined type from the content area of the second response message, the method may further include:

if an additional record identifier in the header information of the second response message is a first identifier, triggering the searching for an additional record of a predefined type from the content area of the second response message.

In this example, when generating the second response message, the DNS may modify the additional record identifier in the header information of the second response message to the first identifier. The additional record identifier is used to identify the number of additional records carried in the second response message. For example, an additional record identifier of 0 indicates that there is no additional record, an additional record identifier of 1 indicates that there is 1 additional record, and an additional record identifier of 2 indicates that there are 2 additional records. In this example, the first identifier may be any positive integer. That is, if determining that there are additional records (unlimited number) in the second response message according to the additional record identifier, the network address translation device may trigger the searching for an additional record of a predefined type from the content area of the second response message. The field "Additional RRs" in the second response message is the additional record identifier, and the value of the field "Additional RRs" is used to indicate the number of additional records. For example, the Additional RRs in FIG. 5 is an additional record identifier, the value of which is modified to 1 by the domain name system, indicating that there is one additional record in the second response message. In another example, if the Additional RRs is 2, it indicating that there are 2 additional records in the second response message.

In this example, the network address translation device may first determine whether the second response message carries additional records according to the additional record identifier. If the second response message does not carry any additional record, there is no need to further query the additional records to avoid useless work; if the second response message carries additional records, the network address translation device then triggers the searching for an additional record of a predefined type from the content area of the second response message, thereby improving the overall implementation efficiency.

In some examples of the present disclosure, after the network address translation device receives the second response message returned by the domain name system for the second address query request, the method may further include:
  determining, by the network address translation device, the second network address corresponding to the first network address according to the first network address and the address translation information recorded in the second response message, generating the domain name system entry according to the first network address, the address translation information and the second network address, and storing the same locally.

It should be noted that the domain name cache entry includes, but are not limited to, the first network address, the address translation information, and the second network address, and may also include other fields according to actual needs, which are not limited in the example of the present disclosure. For example, the domain name cache entry (DNS cache entry) may be that as shown in Table 3 below, in which one of the IPv6 address and the IPv4 address is the first network address, and the other is the second network address; the address translation information may be the prefix information (for example, 2001::) or the corresponding information between the first network address and the second network address recorded in the DNS cache entry.

TABLE 3

| Domain name | IPv6 Address | Prefix and Length | IPv4 Address | Aging time |
|---|---|---|---|---|
| Example.com | 2001::1.2.3.4 | 2001::/96 | 1.2.3.4 | 24 hours |
| . . . | . . . | . . . | . . . | . . . |

The aging time TTL may be the same as the aging time recorded in the domain name entry on the DNS by default, or may be manually configured to be less than the aging time recorded in the domain name entry on the DNS, which is not limited in the examples of the present disclosure.

In this example, the network address translation device may generate a DNS cache entry and store it locally, so that after receiving an address query request for the target domain name, the network address translation device may directly query in the local DNS cache entry to obtain the first network address corresponding to the target domain name and feed the first network address back to the client, thereby improving the efficiency of querying the domain name address.

In an example of the present disclosure, after the block S101, the method further includes: querying, by the network address translation device, a network address corresponding to the target domain names locally.

Referring to the forgoing example, in an example, querying, by the network address translation device, a network address corresponding to the target domain names locally may include:
  querying, by the network address translation device, a network address corresponding to the target domain name in the domain name cache entry stored locally.

In this example, after receiving the first address query request, the network address translation device may first query a network address corresponding to the target domain name in the local DNS cache entry; when no such a network address is found in the local DNS cache entry, the network address translation device may query it from the DNS server, thereby improving the efficiency of querying the domain name address.

Furthermore, in an example of the present disclosure, the method may further include:
  if the first network address corresponding to the target domain name is found locally, the network address translation device may trigger the sending a first response message for the first address query request to the client.

In this example, if the network address translation device finds the first network address corresponding to the target domain name locally, the block S104 is triggered, and thus the blocks S102 and the S103 will not be performed, thereby improving the efficiency of querying the domain name address.

It is easily to be understood that, on the basis of the above example, with the block S104 being triggered, and before the block S105, the method may further include:
  querying, the network address translation device, the address translation information between the first network address and the second network address from the domain name system cache entry stored locally, thereby ensuring the performing of the block S105, and improving the efficiency of forwarding the network message cross protocol.

On the basis of any above-mentioned examples, in an example, the address translation information may include the prefix information for the translation from the first network address to the second network address.

On the basis of the above-mentioned examples, in an example, translating, by the network address translation device, the destination address of the service message to the second network may include:
  translating, by the network address translation device, the destination address of the service message from the first network to the second network address by adding/deleting prefix information to/from the first network address.

In this example, by adding/deleting the prefix information to/from the first network address, the network address translation device may translate the first network address to the second network address, which has advantages of simplicity, ease of implementation, and high efficiency.

In another example, after the network address translation device receives a second response message returned by the domain name system for the second address query request, the method may further include:
  according to the prefix information, generating an address translation rule and storing it locally, and a matching item of the address translation rule includes the prefix information.

Translating, by the network address translation device, destination address of the service message to the second network address may include:

according to the prefix information of the first network address, searching for, by the network address translation device, a matched corresponding address translation rule locally; and if the matching is successful, translating the destination address of the service message from the first network address to the second network address according to the matched address translation rule.

In some example, the address translation rule may include a type item and a matching item. The type item may be "prefix" (indicating a prefix), which means that the network address translation device may perform a network address translation by deleting the prefix information. The matching item may include specific prefix information. Based on the address translation rule, the network address translation device may perform a network address translation by deleting the prefix information.

For example, if the prefix information is as shown in Table 3, the address translation rule generated by the network address translation device according to the prefix information is "nat64 prefix-nat64 2001:: 96"; the function of this address translation rule is: when receiving an IPv6 message with the prefix "2001::" subsequently, the network address translation device translates the IPv6 destination address (for example, 2001::1.2.3.4) to an IPv4 destination address (for example, 1.2.3.4) by deleting the prefix according to the address translation rule.

In this example, the network address translation device may accurately and conveniently translate the first network address to the second network address.

Furthermore, in order to distinguish from normal IPv6 addresses, the prefix information used by DNS for network address translation may be designated dedicated prefix information, such as "2001::", "64:FF9B::", etc. DNS64 generally uses the above designated dedicated prefix to translate an IPv4 address to an IPv6 address by default. Thus, the prefixes of different first network addresses translated by DNS will be the same with a high probability. Therefore, in the example, after the network address translation device generates the address translation rule according to the prefix information, the same address translation rule can be used to perform an address translation on different first network addresses with the same prefix, so that the network address translation device may realize cross-protocol translating of a large number of network addresses by storing fewer address translation rules. On one hand, this can save the local storage space of the network address translation device; on the other hand, because of the fewer address translation rules, this facilitates the network address translation device to quickly realize the matching of the address translation rules according to the prefix information, thereby improving the efficiency of translating network address.

Based on the above description, in an example, generating, by the network address translation device, an address translation rule according to the prefix information and storing it locally may include:

searching for, by the network address translation device, a matched corresponding address translation rule locally according to the prefix information recorded in the second response message;

if no matched address translation rule is found, generating, by the network address translation device, an address translation rule according to the prefix information recorded in the second response message and storing it locally; and if a matched address translation rule is found, triggering the block S104.

Since multiple first network addresses may have the same prefix, in this example, the network address translation device may only generate an address translation rule when the prefix information appears at the first time, and do not generate an address translation rule again when the prefix information appears subsequently. Therefore, the redundant work and system load on the network address translation device due to the generation of address translation rules can be effectively reduced, and the work efficiency of the network address translation device can be improved.

Figure 6:
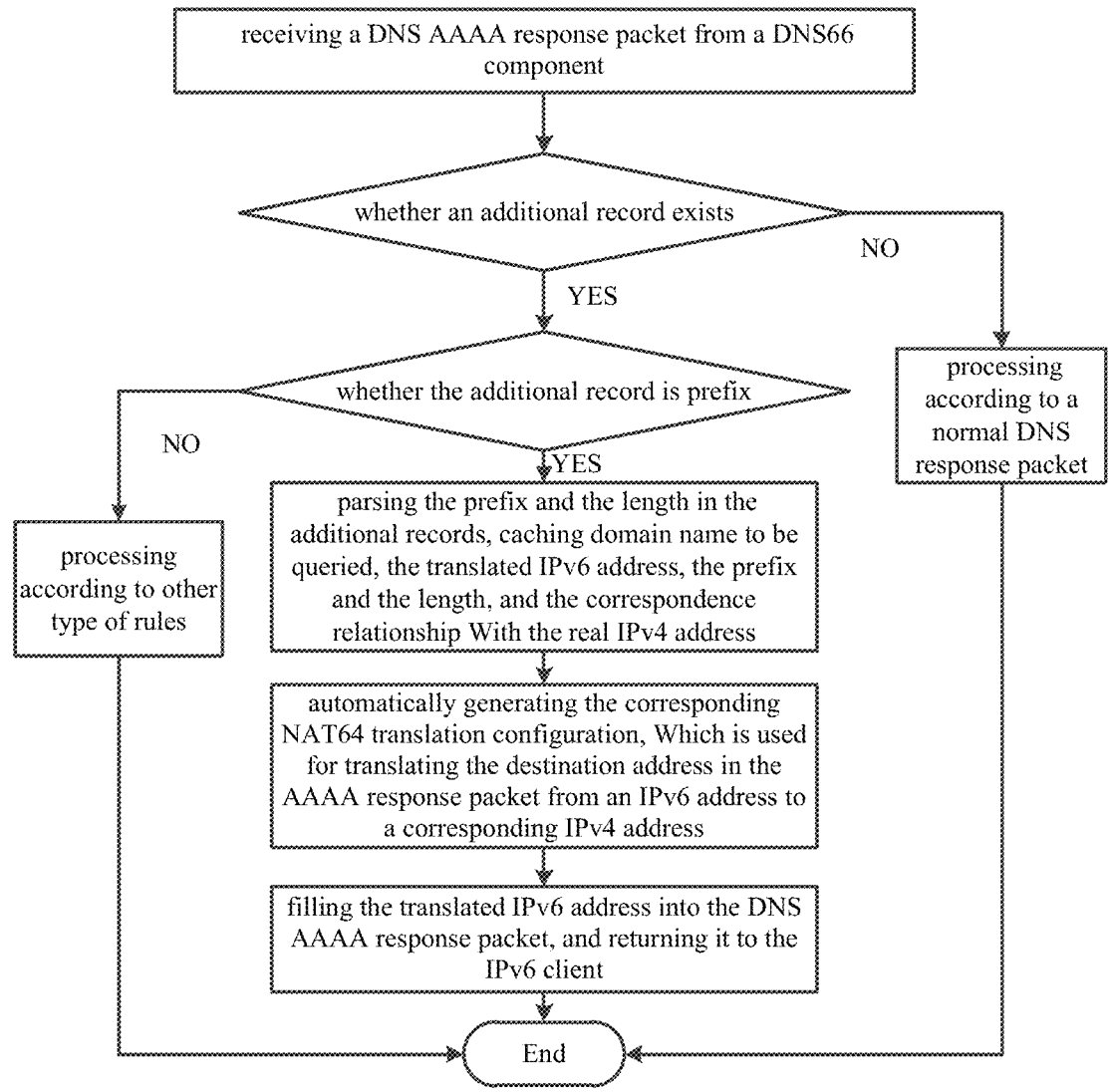
FIG. 6 shows an example flowchart of a method for processing a second response message according to the present disclosure.

FIG. 6 shows an example flow chart of a second response message processing method according to the present disclosure. The above example can be understood with reference to FIG. 6, and FIG. 6 can also be understood with reference to the description of the above-mentioned examples and will not be repeated here.

In FIG. 6, an AAAA response message can be understood as a DNS response message. After receiving an AAAA response message (i.e. a second response message), the network address translation device may first determine whether an additional record exists in the second response message, and then determine whether the type of the additional record is a predefined type (such as "prefix"); if the type of the additional record is not a predefined type, process the additional record as an additional record of another type; and if so, parse the additional record to obtain the prefix information (i.e. the address translation information), the second network address (i.e. the IPv4 address in the figure) and other relevant information; generate the address translation rule (i.e. the NAT64 translation configuration in the figure) according to the above information; add the IPv6 address (i.e. the first network address) to the first response message; and return the first response message to the client.

In FIG. 6, as an example, the first internet protocol is IPv6, the first network address is IPv6 address, the second internet protocol is IPv4, and the second network address is IPv4 address. The domain name system includes a DNS64 server, and accordingly, the network address translation device may be a NAT64 device. Specifically, in FIG. 6, after receiving a DNS AAAA response message (i.e. a second response message) from the DNS64 server, the NAT64 device may determine whether there is an additional record in the DNS AAAA response message; if there is no additional record, process the message as a normal DNS response message; if there is an additional record, determine whether the type of the additional record is a predefined type (for example, "prefix"). If the type of the additional record is not the predefined type, the network address translation device processes the additional record as an additional record of another type; if the type of the additional record is a predefined type, the network address translation device parses the prefix and length in the additional record, caches the domain name to be queried, the translated IPv6 address, the prefix and length, and the corresponding relationship between the IPv6 address and the real IPv4 address. The prefix information (i.e. the address translation information), IPv6 address and other related information may be obtained by parsing the additional record. The information obtained by parsing the additional record may be referred to the relevant description in Table 2 above, which will not be repeated here. The network address translation device translates the IPv6 address (i.e. the first network address) into an IPv4 address (i.e. the second network address) according to the prefix information, and caches the prefix information, and the corresponding relationship between the IPv6 address and the IPv4 address.

Then, the NAT64 device automatically generates a corresponding NAT64 translation configuration, which is used to translate the IPv6 address of a message with a destination address of an IPv4 address used in the DNS AAAA response message into an IPv4 address. That is, the NAT64 device generates a NAT64 translation configuration (i.e. an address translation rule) according to the cached corresponding relationship between the IPv6 address and the IPv4 address, and the NAT64 translation configuration is used for translating the IPv6 address into the corresponding IPv4 address when receiving a service message subsequently and if the destination address of the service message is the IPv6 address used in the DNS AAAA response message.

Then, the NAT64 device may fill the translated IPv6 address in the DNS AAAA response message for returning to the IPv6 client. That is, after adding the IPv6 address (i.e. the first network address) into the DNS AAAA response message (i.e. the first response message), the NAT64 device returns the DNS AAAA response message to the IPv6 client.

The above example can not only ensure the smooth implementation of the domain name address query, but also enable the network address translation device to automatically obtain the address translation information in real timw without manual participation, thereby realizing the automatic operation and maintenance of the network address translation device, avoiding the problems of low efficiency and error-prone caused by manually configuring the address translation information for the network address translation device, improving the efficiency, stability and reliability of the operation and maintenance, avoiding network interruption, and ensuring the timely and accurate forwarding of the network messages.

In an example of the present disclosure, the address translation information includes the correspondence information between the first network address and the second network address.

The correspondence information may record the correspondence relationship between the first network address and the second network.

In this example, it can also be effectively ensured that the translation between the first network address and the second network address is performed accurately, so as to ensure that the network address translation device can accurately and in time forward the cross-protocol network message.

On the basis of the above examples, in some examples, translating, by the network address translation device, the destination address of the service message to a second network address may include:

replacing, the network address translation device, the destination address of the service message from the first network address with the second network address according to the correspondence information.

In this example, the network address translation device may translate the first network address into the second network address with a simple replacement operation, which has the advantages of ease of implementation and high efficiency.

It should be noted that in some optional implementations, at block S105, the network address translation device can query the address translation information corresponding to the destination address of the service message from the domain name system cache entry, and then translate the destination address according to the found address translation information. The block S105 can be implemented as follows.

The network address translation device receives a service message sent by the client, wherein a destination address of the service message is the first network address; queries the address translation information corresponding to the first network address from the domain name cache entry stored locally; according to the queried address translation information, translates the destination address of the service message to the second network address; and sends the service message with the translated destination address to the target server.

For example, as the above exemplary description of the domain name system cache entry, the domain name system may include the first network address, address translation information, and the second network address. The address translation information may be prefix information (e.g., 2001::), or the correspondence information between the first network address and the second network address recorded in the DNS cache table entry.

Therefore, the network address translation device may find the correspondence information between the first network address and the second network address according to the domain name system cache entry, and according to the correspondence information, replace the destination address of the service message from the first network address with the second network address. In an example, the network address translation device may find the prefix information corresponding to the first network address according to the domain name system cache entry, and according to the prefix information, translate the destination address of the service message from the first network address to the second network address by adding/deleting the prefix information to/from the first network address. For example, if the first network address is an IPv6 address, the network address translation device may translate the first network address into an IPv4 address (i.e., the second network address) by deleting the prefix information from the first network address. For example, if the first network address is an IPv4 address, after finding the prefix information, the network address translation device may translate the first network address into an IPv6 address (i.e., the second network address) by adding the prefix information to the first network address.

In this example, the network address translation device may realize the translation from the IPv6 address to the IPv4 address and the translation from the IPv4 address to the IPv6 address by using the domain name cache entry, which has the advantages of high translation accuracy and high efficiency.

In some other examples, the translation between IPv6 addresses and IPv4 addresses can be realized in combination with DNS cache entries and address translation rules.

For example, if the address translation rule is "nat64 prefix-nat64 2001:: 96", the function of the address translation rule is: when subsequently receiving an IPv6 message with the prefix "2001::", the network address translation device translates the IPv6 destination address (for example, 2001::1.2.3.4) into an IPv4 address (for example, 1.2.3.4) by deleting the prefix according to the address translation rule. For example, when receiving an IPv4 message with a destination address of 1.2.3.4, which does not match any address translation rule, the network address translation device will query an IP address 1.2.3.4 in the domain name system cache entries (as shown in Table 3). After querying and finding a corresponding entry, the prefix "2001::" is added to the destination address 1.2.3.4 of the IPv4 message to obtain a corresponding IPv6 destination address 2001::1.2.3.4.

Figure 7:
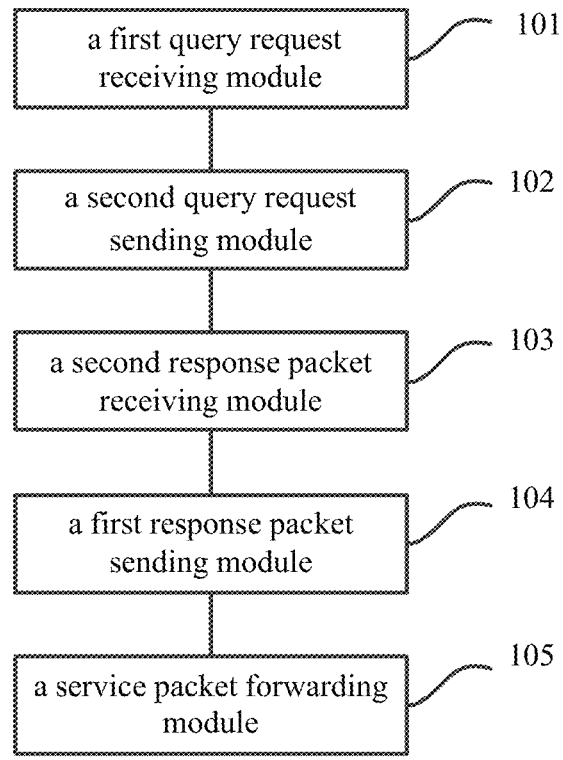
FIG. 7 shows an example diagram of a message forwarding apparatus according to the present disclosure.

In the above examples, a message forwarding method is provided. Correspondingly, a message forwarding apparatus is also provided by an example of the present disclosure. The message forwarding apparatus according to the example of the present disclosure may implement the above message forwarding method. The message forwarding apparatus may be implemented by software, hardware, or a combination of software and hardware. For example, the message forwarding apparatus may include integrated or separate functional modules or units to perform corresponding blocks in the above methods. FIG. 7 shows an example diagram of a message forwarding apparatus according to the present disclosure. Since the apparatus example is substantially similar to the method example, the description is relatively simple, and the relevant part can be referred to the part of the description of the method example. The apparatus examples described below are merely schematic.

As shown in FIG. 7, a message forwarding apparatus according to an example of the present disclosure, which is applied to a network address translation device, may include:

a first query request receiving module 101 to receive a first address query request for a target domain name sent by a client, wherein the client uses a first internet protocol, and a target server corresponding to the target domain name uses a second internet protocol.

a second query request sending module 102 to, if a network address corresponding to the target domain name is not found locally, send a second address query request for the target domain name to a domain name system;

a second response message receiving module 103 to receive a second response message returned by the domain name system for the second address query request, wherein the second response message records a first network address and address translation information between the first network address and a second network address; the second network address includes a network address that supports the second internet protocol and corresponds to the target domain name; and the first network address includes a network address, which supports the first internet protocol, translated by the domain name system from the second network address;

a first response message sending module 104 to send a first response message for the first network address query request to the client, wherein the first response message includes the first network address; and a service message forwarding module 105 to receive a service message sent by the client, wherein a destination address of the service message is the first network address; translate the destination address of the service message into the second network address according to the address translation information, and send the service message with the translated destination address to the target server.

In an example of the present disclosure, the second response message includes an additional record for recording the address translation information between the first network address and the second network address.

In an example of the present disclosure, the apparatus may further include:

an additional record query module to search for an additional record of a predefined type from content area of the second response message; and an additional record reading module to read the address translation information between the first network address and the second network address from the additional record of the predefined type.

In an example of the present disclosure, the apparatus may further include:

an information reading trigger module to, if an additional record identifier in header information of the second response message is a first identifier, trigger the operation of the additional record reading module.

In an example of the present disclosure, the apparatus may further include:

a second network address determining module to determine a second network address corresponding to the first network address according to the first network address and the address translation information recorded in the second response message; and a cache entry generation module to generate a domain name system cache entry according to the first network address, the address translation information and the second network address, and store the domain name system cache entry locally.

In an example of the present disclosure, the apparatus may further include:

a local query successful processing module to, if a first network address corresponding to the target domain name is found locally, triggering the operation of the first response message sending module 104.

In an example of the present disclosure, the address translation information includes prefix information for the translation from the first network address to the second network address; or the address translation information includes correspondence information between the first network address and the second network address.

In an example of the present disclosure, the service message forwarding module 105 may include:

a correspondence information translating unit to replace the destination address of the service message from the first network address with the second network address according to the correspondence information according to the above correspondence information.

In an example of the present disclosure, the address translation information includes prefix information for the translation from the first network address to the second network address;

the apparatus may further include:

an address translation rule generating module to generate an address translation rule according to the prefix information, and store the address translation rule locally, wherein a matching item of the address translation rule includes the prefix information; and the service message forwarding module 105 may include:

an address translation rule matching unit to search for a matched address translation rule locally according to the prefix information of the first network address;

a rule-based translation unit to, if a matched address translation rule is found, translate the destination address of the service message from the first network address to the second network address according to the matched address translation rule.

In an example of the present disclosure, the first internet protocol may include an Internet protocol version 6, IPv6, and the second internet protocol may include an Internet protocol version 4, IPv4; or the first internet protocol may include the Internet protocol version 4, IPv4, and the second internet protocol may include the Internet protocol version 6, IPv6.

The example of the present disclosure provides a message forwarding apparatus has the same inventive concept as that of the message forwarding method provided by the above-mentioned example of the present, having the same beneficial effect.

In the above-mentioned example, a message forwarding method is provided. Correspondingly, the present disclosure provides a domain address query method. The domain name address query method is implemented in cooperation with the above-mentioned forwarding method, and belongs to the same inventive concept. Therefore, the following examples of the domain name address query method can be understood with reference to the foregoing examples of the message forwarding method, and part of the content will not be repeated. Correspondingly, the foregoing examples of the message forwarding method can also be understood with reference to the following examples of the domain name address query method.

Figure 8:
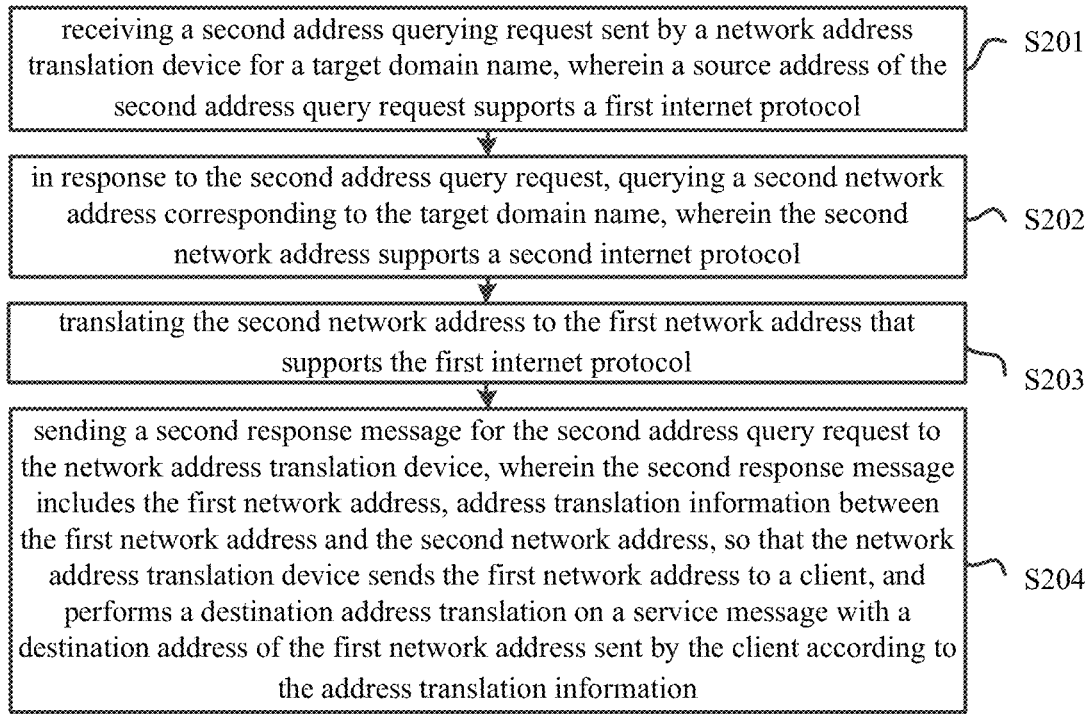
FIG. 8 shows an example flowchart of a method for querying a domain name address according to the present disclosure.

FIG. 8 shows an example flowchart of a domain name address query method according to an example of the present disclosure. The domain name address query method is applied to a domain name system. The method can be understood with reference to the flowchart shown in FIG. 11, and the method may include the following blocks:

- block S201: receiving a second address query request sent by a network address translation device for a target domain name, wherein a source address of the second address query request supports a first internet protocol;
- block S202: in response to the second address query request, querying a second network address corresponding to the target domain name, wherein the second network address supports a second internet protocol;
- block S203: translating the second network address to the first network address that supports the first internet protocol; and
- block S204: sending a second response message for the second address query request to the network address translation device, wherein the second response message includes the first network address and address translation information between the first network address and the second network address, so that the network address translation device sends the first network address to a client, and performs a destination address translation on a service message sent by the client according to the address translation information, wherein a destination address of the service message is the first network address.

In an example, after the network address translation device receives the service message sent by the client, if the destination address of the service message is the first network address, the network address translation may translate the destination address of the service message to the second network address according to the address translation information.

The domain name query method according to the example of the present disclosure has the same inventive concept as that of the message forwarding method provided by the example of the application, having at least the following beneficial effects: after receiving the address query request cross-protocol, the domain name system first queries the second network address supporting the second internet protocol corresponding to the target domain name, then translates the second network address to the first network address supporting the first internet protocol. Then the domain name sends the address translation information between the first network address and the second network address to the network address translation device, and therefore the network address translation device can be automatically synchronized with the domain name system according to the address translation information, and thus the network address translation device can be promoted to realize automatic operation and maintenance, thereby avoiding the problems of low efficiency and fallibility caused by manual configuring address translation information for the network address translation device, improving the efficiency, stability and reliability of operation and maintenance, avoiding network interruption, and facilitating to ensure that the network address translation device forwards network messages across protocols in time and accurately.

Furthermore, the domain name system can ensure that the network address translation device returns the queried first network address to the client to realize the function of a proxy DNS by sending the first network address to the network address translation device, and then ensure the smooth implementation of the domain name query; Further, the domain name system sends the first network address along with the address translation information to the network address translation device, which can simplify the data transferring sequence among the domain name system, the network address translation device and the client, thus improving the data transferring efficiency and saving the network transforming resource.

In an example of the present disclosure, the second response message includes an additional record configured for recording the address translation information between the first network address and the second network address.

With regard to the relevant explanation of the additional records, the relevant description of the examples of the message forwarding method and of FIGS. 4,5 and 6 can be referred to, which are not repeated here.

In an example of the present disclosure, the network translation information includes the prefix information for the translation from the first network address to the second network address.

Figure 9:
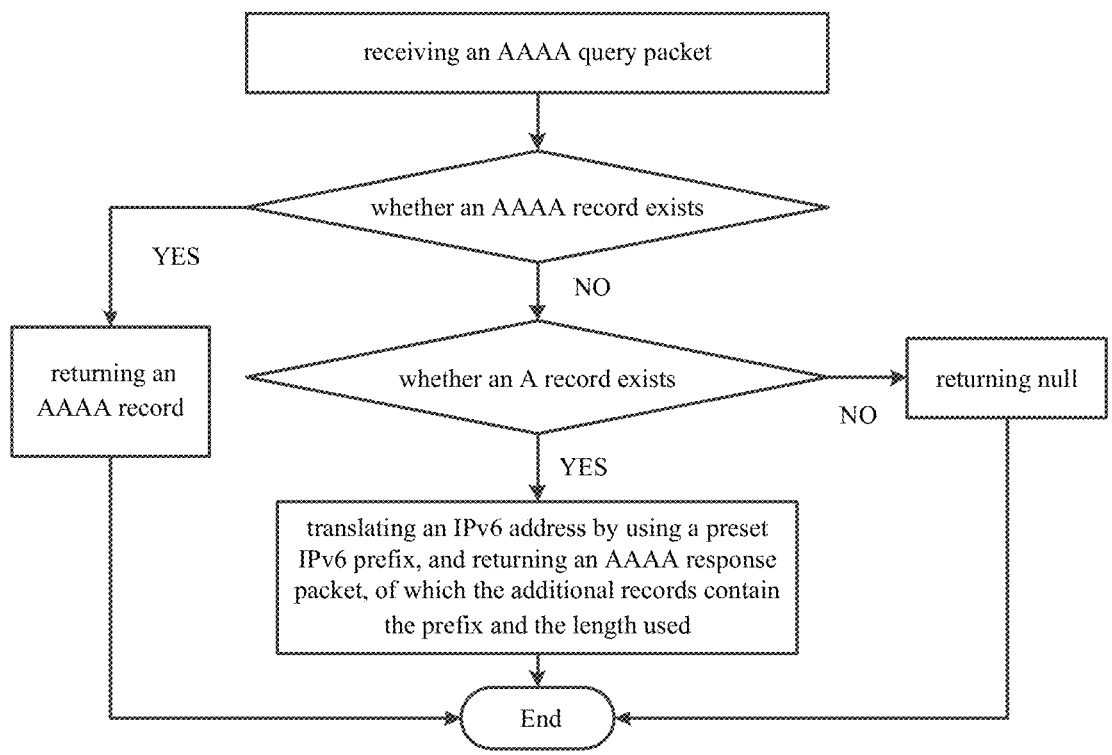
FIG. 9 shows an example flowchart of a method for querying a domain name address according to the present disclosure.

FIG. 9 shows an example flowchart of a domain name query method according to an example of the present disclosure. The foregoing example can be understood with reference to FIG. 9. FIG. 9 can also be understood with reference to the description of the example, which are not repeated here.

In FIG. 9, an AAAA response message can be understood as a DNS response message. After receiving the AAAA response message (i.e. the second address query request), the DNS may first query whether there is an AAAA record (the domain name of IPv6) corresponding to the target domain name; if so, directly return the AAAA record; if not, further query whether there is an A record (the domain name of IPv4); if not, return null; if so, translate an IPv6 address by using a preset IPv6 prefix and return the AAAA response message (i.e. the second response message), and add an additional record to the second response message, in which the above IPv6 prefix and the length are recorded.

For example, the flowchart shown in FIG. 9 is performed by the DNS64 server. Accordingly, the network address translation device may be a NAT64 device. The first internet protocol is IPv6, the first network address is IPv6 address, the second internet protocol is IPv4, and the second network address is IPv4 address.

Specifically, in FIG. 9, after receiving the AAAA response message (i.e. the second address query message), the DNS64 server may first query whether there is an AAAA record (the domain name of IPv6) corresponding to the target domain name; if there is an AAAA record corresponding to the target domain name, it directly returns the AAAA record to the NAT64 device; if there is no AAAA record corresponding to the target domain name, the DNS64 server further queries whether there is an A record (the domain name of IPv4); if there is no A record, returns null; if there is an A record, it translates an IPv6 address by using a preset IPv6 prefix, and returns the AAAA response message (i.e. the second response message) to the NAT64 device. The second response message includes additional records. The additional message records the above IPv6 prefix, and other information included in the additional records can be referred to the relevant description of the above-mentioned Table 2, which are not repeated here.

In an example of the present disclosure, the address translation information includes correspondence information between the first network address and the second network address.

Similarly to Table 2, as one example, the correspondence information can be filled into an additional record with reference to the Table 4 below.

TABLE 4

| Field | Length | Description |
|---|---|---|
| NAME (the NAME in FIG. 4a) | undefined length | the domain name contained in the resource record, such as example.com |
| TYPE (the Type in FIG. 4a) | 2 bytes | indicating the type of resource record, which is "prefix" in the example of the present disclosure, and the value is 64 |
| CLASS (the Class in FIG. 4a) | 2 bytes | indicating the class of RDATA, the value may be "IN(0x0001)" |
| TTL | 4 bytes | an unsigned integer indicating the time that the additional record can be cached. 0 means it can only be transmitted, not cached |
| RDLENGTH (the RDlength in FIG. 4a) | 2 bytes | an Unsigned integer, indicating the length of RDATA, calculated by actual |
| RDATA(the Rdata in FIG. 4a) | undefined length | string, indicating the detailed content of the additional record; in this example, it indicates the prefix and length used to translate the IPv6 address |

Through the above-mentioned implementation, the additional record can be added according to a preset format, and the type of the additional record is specified, thereby ensuring that the network address translation device can automatically and correctly parse the above-mentioned additional record according to the above format and type to obtain the address translation information.

In an example of the present disclosure, translating the second network address to the first network address supporting the first internet protocol includes:

selecting a network address that supports the first Internet protocol from a preset address pool as the first network address, to which the second network address is to be translated. That is to say, the domain name system may select a network address from the preset address pool as the first network address.

For example, if the first internet protocol is IPv6, the second internet protocol is IPv4 and, one IPv6 address pool can be configured on the DNS priestly. After receiving the second address query request, if finding the second network address corresponding to the target domain name is an IPv4 address, the DNS can select one IPv6 address from the IPv6 address pool as the first network address to be translated with the second network address to distribute to the target domain name. That is, the IPv6 address is distributed to the target domain name.

Through this implementation, the domain name can translate the second network address to the first network address by using the address pool, which has the advantages of ease of implementation and high efficiency.

In the above-mentioned example, a domain name query method is provided. Correspondingly, the examples of the present disclosure also provides a domain name query apparatus. The domain name query apparatus provided by the examples of the present disclosure can implement the above-mentioned domain name query method, and the domain name query apparatus can be realized by software, hardware or combination of the software and hardware. For example, the domain name address query apparatus can include integrated or separate functional module to perform the corresponding blocks of the above-mentioned method. Please refer to FIG. 10, which shows a schematic diagram of a domain name address query apparatus. Since the examples of the apparatus is substantially similar to the examples of the method, the description is relatively simple, the relevant part can be referred to the examples of the method. The description of the examples of the apparatus is merely schematic.

Figure 10:
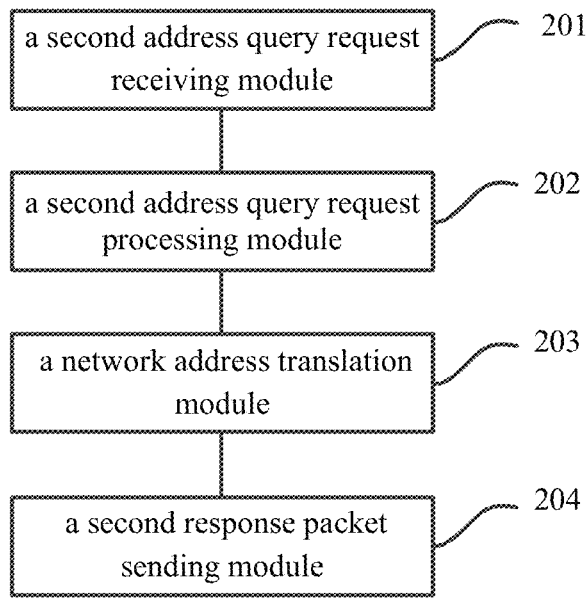
FIG. 10 shows an example structural diagram of an apparatus for querying a domain name address according to the present disclosure.

A domain name query apparatus according to an example of the present disclosure, which is applied to a domain name system, as shown in FIG. 10, may include:

a second address query request receiving module 201 to receive a second address query request sent by a network address translation device for a target domain name, wherein a source address of the second address query request supports a first internet protocol;

a second address query request processing module 202 to, in response to the second address query request, query a second network address corresponding to the target domain name, wherein the second network address supports a second internet protocol;

a network address translation module 203 to translate the second network address to the first network address that supports the first internet protocol; and a second response message sending module 204 to send a second response message for the second address query request to the network address translation device, wherein the second response message includes the first network address and address translation information between the first network address and the second network address, so that the network address translation device sends the first network address to a client, and performs a destination address translation on a service message sent by the client according to the address translation information, wherein a destination address of the service message is the first network address.

In an example of the present disclosure, the second response message includes an additional record for recording the address translation information between the first network address and the second network address.

In an example of the present disclosure, the address translation information includes prefix information for the translation from the first network address to the second network address.

In an example of the present disclosure, the address translation information includes correspondence information between the first network address and the second network address.

In an example of the present disclosure, the network address translation module 203 may include:

a network address selecting unit to select a network address that supports the first Internet protocol from a preset address pool as the first network address, to which the second network address is to be translated.

The domain name address query apparatus provided by the examples of the present disclosure has the same inventive concept as that of the domain name address query method provided by the examples of the present disclosure, having the same beneficial effect.

For ease of understanding, the method provided by the examples of the present disclosure will be illustrated with reference to the time sequence diagram shown in FIG. 11 below. The following exemplary description can be referred to the relevant descriptions in the above-mentioned examples of the message forwarding method and domain name address query method, and the above-mentioned examples of the message forwarding method and domain name address query method can also be understood with reference to the following exemplary description.

Referring to FIG. 11, the specific example may include at least the following blocks S301-S310:

block S301: when a client supporting the first internet protocol queries an address corresponding to the target domain name, the client sends the first address query request for the target domain name to the network address translation device, block S302: after receiving the first address query request, the network address translation device queries a network address corresponding to the target domain name locally; if no such network address is found, it sends a second address query request for the target domain name to the domain name system.

block S303: after receiving the second address query request, if the second network address only supports the second internet protocol, the domain name system translates the second network address to the first network address that supports the first internet protocol.

block S304: the domain name system sends the second response message for the second address query request to the network address translation device, and the second response message records the first network address and the address translation information between the first network address and the second network address.

block S305: after receiving the second response message, the network address translation device sends a first response message to the client for the first query request, wherein the first response message includes the first network address.

block S306: the network address translation device further stores at least the address translation information between the first network address and the second network address locally.

block S307: after receiving the first network address, the client sends a service message to the target server corresponding to the target domain name according to the first network address, and the destination address of the service message is the first network address.

block S308: after receiving the service message, the network address translation device translates the destination address of the service message from the first network address to the second network address, and sends the service message with the translated destination address to the target server, and at the same time, generates a session entry between the client and the target server.

block S309: after receiving the service message, the target server returns the response message for the service message, wherein the source address of the response message is the second network address.

block S310: after receiving the response message, the network address translation device translates the source address of the response message from the second network address to the first network address according to the session entry, and sends the translated response message to the client.

Figure 12:
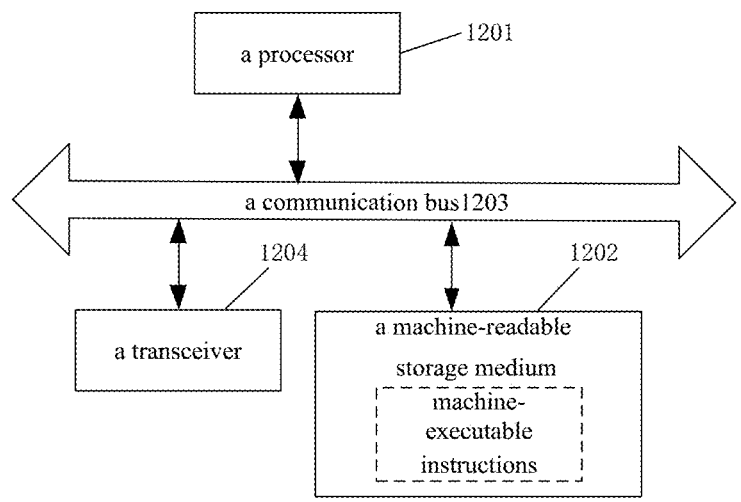
FIG. 12 shows an example structural diagram of a network address translation device according to the present disclosure.

Corresponding to the message forwarding method according to an example of the present disclosure, an example of the present disclosure provides a network address translation device, as shown in FIG. 12, including a processor 1201, a machine-readable storage medium 1202 and a transceiver 1204. The machine-readable storage medium 1202 stores machine-executable instructions are executable by the processor 1201; and the machine-executable instructions causes the processor 1201 to perform the following blocks:

receiving, by the transceiver 1204, a first address query request for a target domain name sent by a client, wherein the client uses a first internet protocol, and a target server corresponding to the target domain name uses a second internet protocol;

if a network address corresponding to the target domain name is not found locally, sending, by the transceiver 1204, a second address query request for the target domain name to a domain name system;

receiving, by the transceiver 1204, a second response message returned by the domain name system for the second address query request, wherein the second response message records a first network address and address translation information between the first network address and a second network address; the second network address includes a network address that supports the second internet protocol and corresponds to the target domain name; and the first network address includes a network address, which supports the first internet protocol, translated by the domain name system from the second network address;

sending, by the transceiver 1204, a first response message for the first network address query request to the client, wherein the first response message includes the first network address; and receiving, by the transceiver 1204, a service message sent by the client, wherein a destination address of the service message is the first network address; translating the destination address of the service message into the second network address according to the address translation information, and sending the service message with the translated destination address to the target server.

In an example, the second response message includes additional records for recording address translation information between the first network address and the second network address.

In an example, the machine-executable instruction also causes the processor 1201 to perform the following blocks:

after receiving a second response message returned by the domain name system for the second address query request, searching for an additional record of a predefined type from the content area of the second response message; and reading the address translation information between the first network address and the second network address from the additional record of the predefined type.

In an example, the machine-executable instruction also causes the processor 1201 to perform the following blocks:

if an additional record identifier in the header information of the second response message is a first identifier, triggering the searching for an additional record of a predefined type from the content area of the second response message.

Optionally, the machine-executable instruction also causes the processor 1201 to perform the following operations:

after receiving a second response message returned by the domain name system for the second address query request, determining the second network address corresponding to the first network address according to the first network address and the address translation information recorded in the second response message; and generating a domain name system cache entry according to the first network address, the address translation information and the second network address, and storing it locally.

In an example, the machine-executable instruction also causes the processor 1201 to perform the following operations:

if the first network address corresponding to the target domain name is not found locally, triggering the sending a first response message for the first network address query request to the client.

In an example, the address translation information comprises the prefix information for the translation from the first network address to the second network address; or the address translation information comprises correspondence information between the first network address and second network address.

In an example, the machine-executable instruction also causes the processor 1201 to perform the following operations:

translating the destination address of the service message from the first network address to the second network address by adding/deleting the prefix information to/from the first network address; or replacing the destination address of the service message from the first network address with the second network address according to the correspondence information.

In an example, the address translation information comprises the prefix information for the translation from the first network address to the second network address.

The machine-executable instruction also causes the processor 1201 to perform the following operations:

generating an address translation rule according to the prefix information and storing it locally; and the matching item of the address translation rule comprises the prefix information;

The machine-executable instruction also causes the processor 1201 to perform the following operations:

searching for a matched address translation rule locally according to the prefix information of the first network address; and if a matched address translation rule is found, translating the destination address of the service message from the first network address to the second network address according to the matched address translation rule.

As shown in FIG. 12, the network address translation device also includes a communication bus 1203, a processor 1201, a machine-readable storage medium 1202 and a transceiver 1204 which communicate with each other via the communication bus 1203. The communication bus 1203 may be a Peripheral Component Interconnect (PCI) bus or an Extended Industry Standard Architecture (EISA) bus, etc. The communication bus 1203 may be divided into an address bus, a data bus, a control bus, etc.

The transceiver 1204 may be a wireless communication module, and under the control of the processor 1202, the transceiver 1204 performs data interaction with other devices (AC and terminals).

The machine-readable storage medium 1202 may include a Random Access Memory (RAM), and also may include a Non-Volatile Memory (NVM), for example, at least one disk storage. In addition, the machine-readable storage medium 1202 may further be at least one remote storage apparatus from the above-mentioned processor.

The processor 1201 may be a general purpose processor including a central processing unit (CPU), Network Processor (NP), etc.; and it may also be digital signal processing (DSP), Application Specific Integrated Circuit (ASIC), Field Programmable Gate Array (FPGA), or other programmable logic devices, discrete gates or transistor logic devices, discrete hardware components.

The network address translation device provided by the example of the present disclosure has the same technical concept as that of the message forwarding method provided by the example of the present disclosure, and has the same beneficial effects as the method employed, operated, or implemented.

Figure 13:
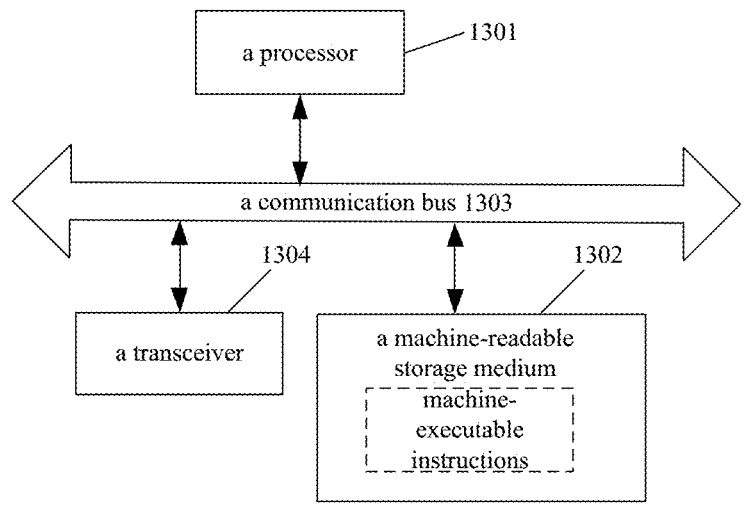
FIG. 13 shows an example structural diagram of a domain name system according to the present disclosure.

Corresponding to the domain name query method according to an example of the present disclosure, an example of the present disclosure provides a domain name system, as shown in FIG. 13, including a processor 1301, a machine-readable storage medium 1302 and a transceiver 1304. The machine-readable storage medium 1302 stores machine-executable instructions are executable by the processor 1301; the machine-executable instructions cause the processor 1301 to perform the following operations:

receiving, by the transceiver 1304, a second address query request sent by a network address translation device for a target domain name, wherein a source address of the second address query request supports a first internet protocol;

in response to the second address query request, querying a second network address corresponding to the target domain name, wherein the second network address supports a second internet protocol;

translating the second network address to the first network address that supports the first internet protocol; and sending, by the transceiver 1304, a second response message for the second address query request to the network address translation device, wherein the second response message includes the first network address and address translation information between the first network address and the second network address, so that the network address translation device sends the first network address to a client, and performs a destination address translation on a service message sent by the client according to the address translation information, wherein a destination address of the service message is the first network address.

In an example, the second response message includes additional records for recording address translation information between the first network address and the second network address.

In an example, the address translation information comprises prefix information for the translation from the first network address to the second network address; or the address translation information comprises correspondence information between the first network address and the second network address.

In an example, the address translation information comprises correspondence information between the first network address and the second network address.

The machine-executable instructions cause the processor 1301 to perform the following operations:

selecting a network address that supports the first Internet protocol from a preset address pool as the first network address, to which the second network address is to be translated.

As shown in FIG. 13, the network address translation device also includes a communication bus 1303, a processor 1301, a machine-readable storage medium 1302 and a transceiver 1304 which communicate with each other via the communication bus 1303. The communication bus 1303 may be a Peripheral Component Interconnect (PCI) bus or a Extended Industry Standard Architecture (EISA) bus, etc. The communication bus 1303 may be divided into an address bus, a data bus, a control bus, etc.

The transceiver 1304 may be a wireless communication module; and under the control of the processor 1302, the transceiver 1304 performs data interaction with other devices (AC and terminals).

The machine-readable storage medium 1302 may include a Random Access Memory (RAM), and also may include a Non-Volatile Memory (NVM), for example, at least one disk storage. In addition, the machine-readable storage medium 1302 may further be at least one remote storage apparatus from the above-mentioned processor.

The processor 1301 may be a general purpose processor including Central Processing Unit (CPU), Network Processor (NP), etc.; and it may also be digital signal processing (DSP), Application Specific Integrated Circuit (ASIC), Field Programmable Gate Array (FPGA), or other programmable logic devices, discrete gates or transistor logic devices, discrete hardware components.

The domain name system provided by the example of the present disclosure has the same technical concept as that of the domain name address query method provided by the example of the present disclosure, and has the same beneficial effects as the method employed, operated, or implemented.

Figure 14:
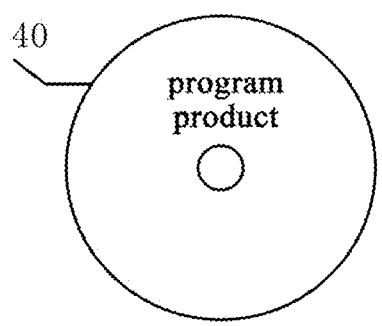
FIG. 14 shows an example diagram of a computer-readable medium according to the present disclosure.

The examples of the present disclosure also provides a computer-readable medium corresponding to the message forwarding method and domain name address query method provided by the above-mentioned examples. Please refer to FIG. 14, which shows the computer-readable storage medium as an optical disc 40, with computer programs (i.e., a program product) stored thereon, and when the computer program is executed by a processor (for example, the above-mentioned processor) to implement the message forwarding method or domain name address query method provided by any of the above-mentioned examples.

It should be noted that examples of the computer-readable storage medium may also include, but are not limited to, Phase Change Memory (PRAM), Static Random Access Memory (SRAM), Dynamic Random Access Memory (DRAM), and other types of Random Access Memory (RAM), Read-only Memory (ROM), Electrically Erasable Programmable Read-only Memory (EEPROM), Flash Memory or other optical and magnetic storage media will not be repeated here.

The computer-readable storage medium provided by the example of the present disclosure has the same the same technical concept as that of the domain name address query and domain name address query method provided by the example of the present disclosure, and has the same beneficial effects as the program stored the computer-readable storage medium which is employed, operated, or implemented.

In another example provided by this application, a computer program product including instructions is also provided; which causes a computer to execute any operations of the message forwarding method or domain name address query method in the above examples when running on the computer.

It should be noted that the flowcharts and block diagrams in the drawings show the possible implementation architecture, functions, and operations of the system, method, and computer program product according to the multiple examples of the present disclosure. In this regard, each block in the flowchart or block diagram may represent one module, program segment, or part of codes, and the module, program segment, or part of codes includes executable instructions for realizing one or more specified logic functions. It should also be noted that, in some alternative implementations, the functions marked in the block may also occur in a different order from the order marked in the drawings. For example, two consecutive blocks can actually be executed in parallel, or they can sometimes be executed in the reverse order, depending on the functions involved. It should also be noted that each block in the block diagram and/or flowchart, and the combination of the blocks in the block diagram and/or flowchart, can be implemented by a dedicated hardware-based system that performs the specified functions or actions or can be implemented by a combination of dedicated hardware and computer instructions.

Those skilled in the art can clearly understand that, for the convenience and conciseness of the description, the specific working process of the system, device and unit described above can refer to the corresponding process in the foregoing method example, which is not repeated here.

In the several examples provided by this application, it should be understood that the disclosed apparatus and method can be implemented in other ways. The apparatus examples described above are merely schematic. For example, the division of the units is only a logical function division, and there may be other divisions in actual implementation. For example, multiple units or components may be combined or integrated into another system, or some features can be ignored or not implemented. In addition, the displayed or discussed mutual coupling or direct coupling or communication connection may be indirect coupling or communication connection through some physical ports, apparatus or units which may be in electrical, mechanical or other forms.

The units described as separate components may or may not be physically separated, and the components displayed as units may or may not be physical units, that is, they may be located in one place, or they may be distributed on multiple network units. Some or all of the units may be selected according to actual needs to achieve the objectives of the solutions of the examples.

In addition, the functional units in the various examples of the present disclosure may be integrated into one processing unit, or each unit may exist alone physically, or two or more units may be integrated into one unit.

If the function is implemented in the form of a software functional unit and sold or used as an independent product, it can be stored in one computer readable storage medium. Based on this understanding, the technical solution of the present disclosure essentially or the part that contributes to the prior art or the part of the technical solution can be embodied in the form of a software product, which is stored in a storage medium, including several instructions used to cause a computer device (which may be a personal computer, a server, or a network device, etc.) to execute all or part of the operations of the method described in each example of the present disclosure. The aforementioned storage medium includes: U disk, Mobile Hard Disk, Read-only Memory (ROM, Read-Only Memory), Random Access Memory (RAM, Random Access Memory), Magnetic Disk or Optical Disk and other medium that can store program codes.

The descriptions mentioned-above are only preferred examples of the present disclosure, and are not intended to limit the scope of the present disclosure. Any modification, equivalent, or improvement within the spirit and principle of this application are included in the scope of this application.

What is claimed is:

1. A message forwarding method, which is applied to a network address translation device, comprising:
   receiving a first address query request for a target domain name sent by a client, wherein the client uses a first internet protocol, and a target server corresponding to the target domain name uses a second internet protocol;
   if a network address corresponding to the target domain name is not found locally, sending a second address query request for the target domain name to a domain name system;
   receiving a second response message returned by the domain name system for the second address query request, wherein the second response message records a first network address and address translation information between the first network address and a second network address; the second network address includes a network address that supports the second internet protocol and corresponds to the target domain name; and the first network address includes a network address, which supports the first internet protocol, translated by the domain name system from the second network address;
   sending a first response message for the first address query request to the client, wherein the first response message includes the first network address; and
   receiving a service message sent by the client, wherein a destination address of the service message is the first network address; translating the destination address of the service message into the second network address according to the address translation information, and sending the service message with the translated destination address to the target server.

2. The message forwarding method according to claim 1, wherein the second response message includes an additional record for recording the address translation information between the first network address and the second network address; and
   wherein after receiving a second response message returned by the domain name system for the second address query request, the message forwarding method further comprises:
   searching for an additional record of a predefined type from content area of the second response message; and
   reading the address translation information between the first network address and the second network address from the additional record of the predefined type.

3. The message forwarding method according to claim 2, wherein, before searching for an additional record of a predefined type from content area of the second response message, the message forwarding method further comprises:
   if an additional record identifier in header information of the second response message is a first identifier, triggering the searching for an additional record of a predefined type from content area of the second response message.

4. The message forwarding method according to claim 1, wherein, after receiving a second response message returned by the domain name system for the second address query request, the message forwarding method further comprises:
   determining a second network address corresponding to the first network address according to the first network address and the address translation information recorded in the second response message; and
   generating a domain name system cache entry according to the first network address, the address translation information and the second network address, and storing the domain name system cache entry locally.

5. The message forwarding method according to claim 1, further comprising:
   if a first network address corresponding to the target domain name is found locally, triggering the sending a first response message for the first address query request to the client.

6. The message forwarding method according to claim 1, wherein the address translation information includes prefix information for the translation from the first network address to the second network address; or
   the address translation information includes correspondence information between the first network address and the second network address.

7. The message forwarding method according to claim 6, wherein translating the destination address of the service message to the second network address comprises:
   translating the destination address of the service message from the first network address to the second network address by adding/deleting the prefix information to/from the first network address; or
   replacing the destination address of the service message from the first network address with the second network address according to the correspondence information.

8. The message forwarding method according to claim 6, wherein the address translation information includes prefix information for the translation from the first network address to the second network address; and
   wherein after receiving a second response message returned by the domain name system for the second address query request, the message forwarding method further comprises:
   generating an address translation rule according to the prefix information, and storing the address translation rule locally, wherein a matching item of the address translation rule includes the prefix information; and
   wherein translating the destination address of the service message to the second network address comprises:
   searching for a matched address translation rule locally according to the prefix information of the first network address; and
   if a matched address translation rule is found, translating the destination address of the service message from the first network address to the second network address according to the matched address translation rule.

9. A network address translation device, comprising:
   a processor;
   a transceiver; and
   a machine-readable storage medium to store machine-executable instructions that are executable by the processor; wherein the machine-executable instructions cause the processor to perform the message forwarding method of claim 1 by means of the transceiver.

10. A non-transitory computer-readable medium with computer-readable instructions stored thereon, wherein the computer-readable instructions are executable by a processor to implement the message forwarding method according to claim 1.

11. A domain name address query method, which is applied to a domain name system, comprising:
   receiving a second address query request sent by a network address translation device for a target domain name, wherein a source address of the second address query request supports a first internet protocol;
   in response to the second address query request, querying a second network address corresponding to the target domain name, wherein the second network address supports a second internet protocol;
   translating the second network address to the first network address that supports the first internet protocol; and
   sending a second response message for the second address query request to the network address translation device, wherein the second response message includes the first network address and address translation information between the first network address and the second network address, so that the network address translation device sends the first network address to a client, and performs a destination address translation on a service message sent by the client according to the address translation information, wherein a destination address of the service message is the first network address.

12. The domain name address query method according to claim 11, wherein the second response message includes an additional record for recording the address translation information between the first network address and the second network address.

13. The domain name address query method according to claim 11, wherein the address translation information includes prefix information for the translation from the first network address to the second network address; or
   the address translation information includes correspondence information between the first network address and the second network address.

14. The domain name address query method according to claim 11, wherein the address translation information includes correspondence information between the first network address and the second network address; and
   wherein translating the second network address to the first network address that supports the first internet protocol comprises:
   selecting a network address that supports the first internet protocol from a preset address pool as the first network address, to which the second network address is to be translated.

15. A non-transitory computer-readable medium with computer-readable instructions stored thereon, wherein the computer-readable instructions are executable by a processor to implement the domain name address query method according to claim 11.

16. A domain name system, comprising:
   a processor;
   a transceiver;
   a machine-readable storage medium to store machine-executable instructions that are executable by the processor; wherein the machine-executable instructions cause the processor to perform the following operations:
   receiving, by the transceiver, a second address query request sent by a network address translation device for a target domain name, wherein a source address of the second address query request supports a first internet protocol;
   in response to the second address query request, querying a second network address corresponding to the target domain name, wherein the second network address supports a second internet protocol;
   translating the second network address to the first network address that supports the first internet protocol; and
   sending, by the transceiver, a second response message for the second address query request to the network address translation device, wherein the second response message includes the first network address, address translation information between the first network address and the second network address, so that the network address translation device sends the first network address to a client, and performs a destination address translation on a service message sent by the client according to the address translation information, wherein a destination address of the service message is the first network address.

* * * * *